United States Patent
Röttger

(10) Patent No.: US 8,217,959 B2
(45) Date of Patent: Jul. 10, 2012

(54) METHOD AND APPARATUS FOR COLOR VISUALIZATION OF 3D IMAGE DATA WITH A DARK BACKGROUND

(75) Inventor: Stefan Röttger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 743 days.

(21) Appl. No.: 12/318,940

(22) Filed: Jan. 13, 2009

(65) Prior Publication Data

US 2009/0179896 A1 Jul. 16, 2009

(30) Foreign Application Priority Data

Jan. 14, 2008 (DE) .......................... 10 2008 004 145

(51) Int. Cl.
*G90G 5/02* (2006.01)
(52) U.S. Cl. ...................................... 345/593
(58) Field of Classification Search .................... 345/593
See application file for complete search history.

(56) References Cited

U.S. PATENT DOCUMENTS

| | | | | |
|---|---|---|---|---|
| 5,903,274 A | * | 5/1999 | Gibson et al. ................. | 345/427 |
| 7,355,597 B2 | * | 4/2008 | Laidlaw et al. ............... | 345/419 |
| 2006/0007244 A1 | | 1/2006 | Matsumoto | |
| 2007/0236496 A1 | | 10/2007 | Bahadur | |

OTHER PUBLICATIONS http://help.adobe.com/en_US/Illustrator/14.0/illustrator_cs4_help.pdf.*
Elliot K. Fishman et al., Volume Rendering versus Maximum Intensity Projection in CT Angiography: What Works Best, When, and Why, Radio Graphics, May-Jun. 2006, vol. 26, No. 3, pp. 905-923, EHB; Others.

* cited by examiner

*Primary Examiner* — Xiao Wu
*Assistant Examiner* — Kim-Thanh T Tran
(74) *Attorney, Agent, or Firm* — Harness, Dickey & Pierce, P.L.C.

(57) ABSTRACT

A method and an apparatus are disclosed for color visualization of 3D image data of an object using a rendering technique, in particular for tomographic imaging image data. In at least one embodiment, the method calculates pixels of the object from the 3D image data by applying a transfer function, which assigns color values to the 3D image data, and provides said pixels as an image with a bright background. The image with a bright background is inverted to visualize it on a dark background, and the color values assigned to the 3D image data of the object are modified in accordance with a prescribed rule, by means of which the coloring of the image with a dark background obtained by inverting is at least approximately matched to the coloring of the non-inverted image with the original color values. The method of at least one embodiment and the associated apparatus of at least one embodiment allow a rendered display of the object on a dark background to be generated with the impression of having a relatively high contrast.

8 Claims, 2 Drawing Sheets

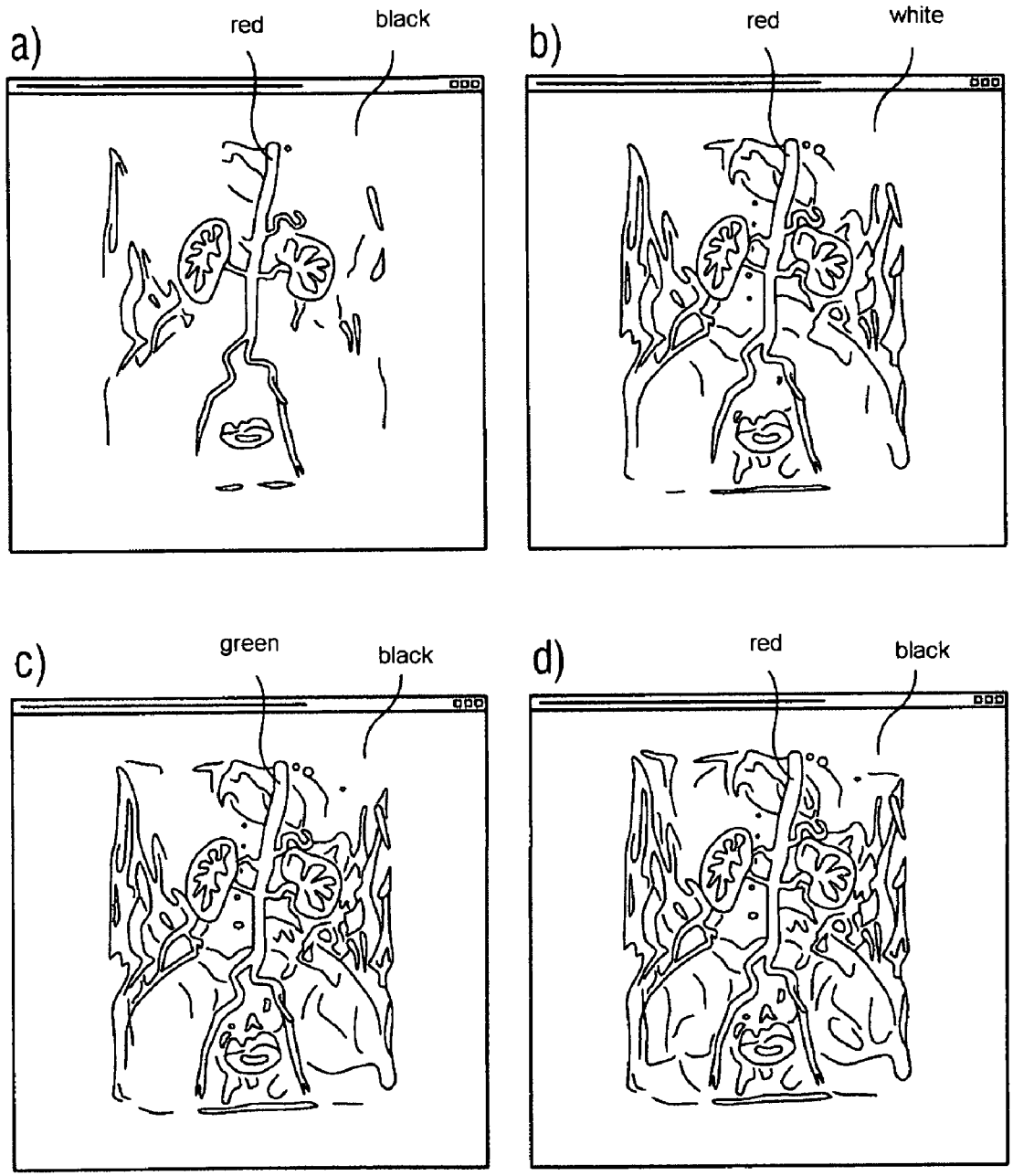

METHOD AND APPARATUS FOR COLOR VISUALIZATION OF 3D IMAGE DATA WITH A DARK BACKGROUND

PRIORITY STATEMENT

The present application hereby claims priority under 35 U.S.C. §119 on German patent application number DE 10 2008 004 145.9 filed Jan. 14, 2008, the entire contents of which is hereby incorporated herein by reference.

FIELD

Embodiments of the present invention generally relate to a method and/or an apparatus for color visualization of 3D image data of an object using a rendering technique. In particular, they may relate to a method and/or an apparatus for color visualization of for tomographic imaging image data, which calculates pixels of the object from the 3D image data by applying a transfer function, which assigns color values to the 3D image data, and displays said pixels in a display area with a dark background.

BACKGROUND

This is a technique for visualizing volumes, in which volume data, obtained by computed tomography (CT) or magnetic resonance imaging (MRI) for example, can be displayed in a display area. Volume rendering (VRT: volume rendering technique) or gradient-magnitude rendering are known examples of such visualization techniques. In these rendering techniques, optical properties have to be assigned to the 3D image data, present in the form of a matrix of scalar values. This is effected by a suitable choice of transfer function which takes into account the optical absorption and emission in the volume to be illustrated. This transfer function can also fix which parts of the volume to be displayed are illustrated opaquely, semi-transparently or transparently in the image. Moreover, in the case of color images, this transfer function assigns defined colors to the individual volume elements (voxels). When being displayed in the RGB color space, this is generally effected by the known value triplet (R, G, B).

In order to calculate the pixels to be displayed from the 3D image data, it is possible to use the so-called ray-casting algorithm, in which each pixel of the image is calculated by integrating or summing along a ray from the eye of the observer through the volume surrounded by the 3D image data. The corresponding transfer function is found in the sum or the integral, and thus the transparencies and colors of the individual voxels along the ray are summed using this.

In the process, the 3D image data is often rendered into an image with a bright image background. However, a large number of users prefer a dark image background, particularly if the image is intended to be looked at in a dark room. For this purpose, some applications allow the background illumination of the image to switched-off, so that the rendered 3D image data of the object now appears on a black image background. However, as a result of this, many images have a deteriorated image contrast, particularly in the field of medical imaging.

US 2007/0236496 A1 describes a graphic art display method for CT images, in which techniques such as duplication, symmetry inversion, contrast inversion, superposition of a number of images or deformation of the image contents, if need be combined with coloring, are applied to obtain a graphic art display. However, the document does not disclose a procedure for improved imaging on a dark image background.

US 2006/0007244 A1 discusses image processing which also uses a volume rendering technique and assigns colors to individual pixels by way of a color table. However, this document does not provide any indications for improved imaging on a dark image background either. The same applies to the article by E. K. Fishman et al.: "Volume Rendering versus Maximum Intensity Projection in CT Angiography: What Works Best, When and Why", Radio Graphics, May-June 2006, vol. 26, no. 3, pages 905-923. This article compares different rendering techniques to one another without, however, discussing the problems associated with imaging on a dark image background.

SUMMARY

In at least one embodiment of the present invention, a method and an apparatus are specified for color visualization of 3D image data of an object using a rendering technique which improves imaging on a dark image background.

The proposed method of at least one embodiment, for color visualization of 3D image data of an object using a rendering technique calculates pixels of the object from the 3D image data in a known fashion by applying a transfer function, which assigns color values to the 3D image data, and provides said pixels as a 2D image with a bright background. The pixels can be calculated from the 3D image data using known algorithms, in particular using the known ray casting algorithm. The image is then available as a two dimensional matrix of pixels. The proposed method distinguishes itself by inverting the image with a bright background for the purposes of visualizing it on a dark background, and by modifying the color values assigned to the 3D image data of the object in accordance with a rule specified below. Modifying the individual RGB color values (R, G, B) of the transfer function in accordance with the specified rule means that the colors are already modified when the pixels of the object are calculated from the 3D image data.

In any case, the pixels have to be calculated from the 3D image data for the first display and every interactive rotation of the image view, so the proposed method does not require any additional recalculations. This rule is selected such that the coloring of the image with a dark background obtained by inverting (at least subjectively) almost corresponds to the coloring of the non-inverted image with the original color values. The image with a dark background, generated by the proposed method, is then displayed in a display area. By means of the proposed inversion of the background-illuminated positive image (image with a bright image background) and the simultaneous modification of the color values in the manner specified (also referred to as a pseudo-inversion of the colors in the following text), a visually high-quality image with a dark image background is generated, the contrast of which being improved compared to the case where only the background illumination is switched off.

The pseudo-inversion on the basis of the color entry in the transfer function applies the following rule for modifying the color values. If (R, G, B) is the color entry in the transfer function, the pseudo-inverted color (R', G', B') is defined as follows:
R'=max(max(G-R, B-R),0)
G'=max(max(R-G, B-G),0)
B'=max(max(R-B, G-B),0).

This prescription is applied to all entries of the transfer function and effects the color correction of the inverted image so that the generated doubly inverted image (inverse+pseudo-inverse) once again has approximately the same subjective coloring as the non-inverted image.

The apparatus designed to carry out the method of at least one embodiment has at least one storage device for the 3D image data, and a computational unit which is set up accordingly in order to carry out the method. The method can utilize different rendering techniques which calculate an image on the basis of a transfer function; examples being techniques with a ray integral such as the volume rendering technique or the gradient-magnitude rendering technique. This method is used particularly advantageously for tomographic imaging in medical-technological applications, in particular to visualize 3D image data from computed tomography or magnetic resonance imaging. A further field of application relates to screening luggage at airports, for example.

BRIEF DESCRIPTION OF THE DRAWINGS

The proposed method will explained again in more detail in the following text on the basis of an example embodiment in conjunction with the drawings, in which:

FIG. 3 shows various visualizations for demonstrating an embodiment of the method.

DETAILED DESCRIPTION OF THE EXAMPLE EMBODIMENTS

Figure 1:
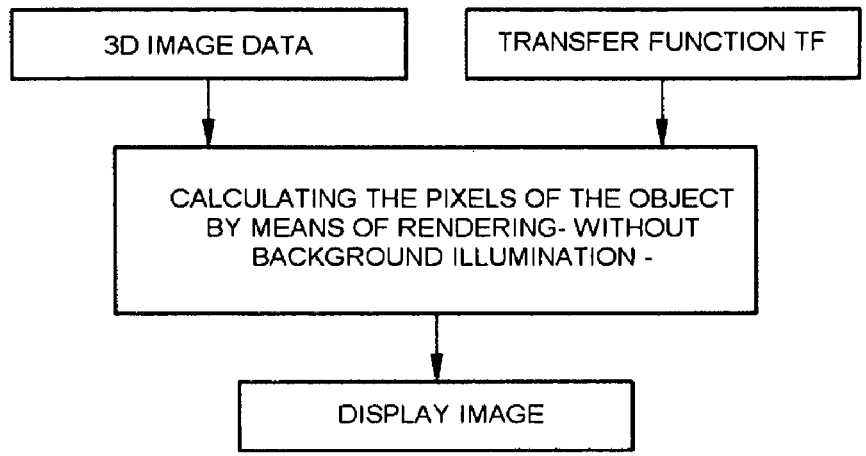
FIG. 1 schematically shows an example of the procedure in accordance with the prior art.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 schematically shows the known procedure for the rendered display of 3D image data of an object on a dark background. First of all, 3D image data of the object to be displayed and a transfer function are provided which can convert the 3D image data into a desired color visualization. In this case, the pixels of the object are calculated from the transfer function without background illumination in a known fashion using a VRT technique. The 2D image on a dark background obtained in this fashion is displayed on the monitor; however, it often only has a low contrast.

Figure 2:
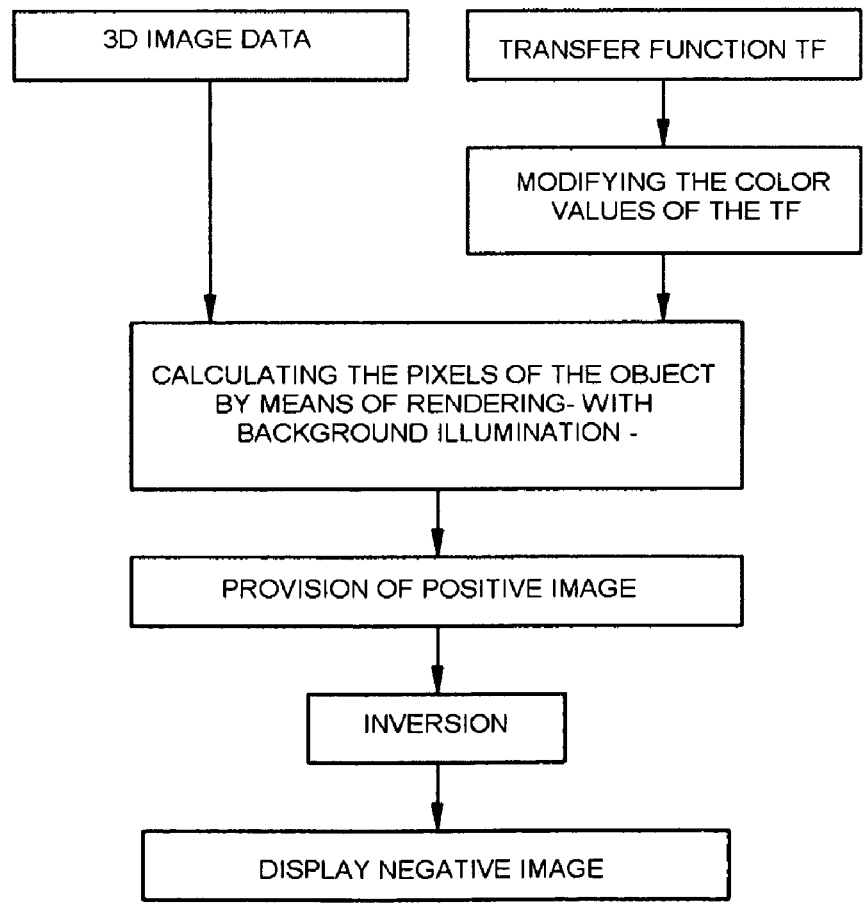
FIG. 2 schematically shows an example of the procedure in the case of an embodiment of the method.

FIG. 2 schematically shows an example of the procedure of an embodiment of the proposed method. First of all, 3D image data of the object to be displayed and a transfer function are provided in an identical fashion which can convert the 3D image data into a desired color visualization by way of a rendering technique. By way of example, the 3D image data can be the CT records of a body region of a person. So that the rendered image data on a dark background can be visualized on a monitor, the color values (R, G, B) assigned to the individual 3D image data in the transfer function are first of all modified to have new color values (R', G', B') in accordance with the following rule:

R'=max(max(G-R, B-R),0)
G'=max(max(R-G, B-G),0)
B'=max(max(R-B, G-B),0).

After this pseudo-inversion of the transfer function, the pixels of the object are calculated in a known fashion from the pseudo-inverted transfer function using a VRT technique. A 2D image with a bright background is generated from the pixels of the object.

In the next step, the image data of this image with a bright background is inverted, i.e. a negative image is generated from the positive image. This inverted image is then displayed on the monitor.

The desired image with a dark background is generated by inverting the image with a bright background. The preceding pseudo-inversion of the transfer function ensures that the details of the object are displayed having an improved contrast despite the dark background than would be the case if the background illumination were to be simply switched off in accordance with the procedure from FIG. 1.

To this end, FIG. 3 shows different visualizations to demonstrate the proposed method in the progression from a) to d). In this case, the pixels of the 3D image data of the object on a dark background, rendered on the basis of the original transfer function, can be seen in FIG. 3a, as obtained by the method in accordance with FIG. 1. In this case, the contrast is relatively low, particularly in the dark regions of the rendered object. FIG. 3b shows the image of this object rendered on a bright background using the original transfer function. As a result of the background illumination, significantly more details are visible than in the original image (FIG. 3a).

FIG. 3c finally shows the inverted image of FIG. 3b with a bright background. However, the color display is modified by the inversion in a fashion unaccustomed for the observer.

Finally, FIG. 3d shows the image generated in accordance with the proposed method which is obtained after a pseudo-inversion of the transfer function and after inverting the image with a bright background obtained thereby. The pseudo-inversion of the transfer function ensures that the colors of the image again look like the original image (FIG. 3a), but with significantly more details being visible on the same dark background.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for color visualization of 3D image data of an object using a rendering technique, the method comprising:
   calculating pixels of the object from the 3D image data by applying a transfer function, which assigns color values of red, green and blue to the 3D image data, and providing said pixels as an image with a bright background;
   inverting the image with the bright background to visualize the image on a dark background, wherein the color values assigned to the 3D image data of the object in the transfer function are modified when calculating the pixels by modifying the color values in accordance with the following rule:

R'=max(max(G-R, B-R),0)
G'=max(max(R-G, B-G),0)
B'=max(max(R-B, G-B),0), wherein (R,G,B) corresponds to original color values of red, green and blue, respectively, in the transfer function and (R',G',B') corresponds to the modified color values of red, green and blue, respectively, and
   displaying the image obtained by the inverting in a display area.

2. The method as claimed in claim 1, wherein a volume rendering technique is used.

3. The method as claimed in claim 1, wherein a gradient-magnitude rendering technique is used.

4. The method of claim 1, wherein the 3D image data is tomographic imaging image data.

5. A non-transitory computer readable medium including program segments for, when executed on a computer device, causing the computer device to implement the method of claim 1.

6. An apparatus for color visualization of 3D image data of an object using a rendering technique, the apparatus comprising:
   a storage device to store the 3D image data; and
   a computational unit configured to calculate pixels of the object from the 3D image data using a rendering technique by applying a transfer function, which assigns color values of red, green and blue to the 3D image data, and to provide said pixels as an image with a bright background, the computational unit being further configured to invert the image with a bright background to visualize the image on a dark background and to modify the color values assigned to the 3D image data of the object in the transfer function when calculating the pixels by modifying the color values in accordance with the following rule:

$R' = \max(\max(G-R, B-R), 0)$
$G' = \max(\max(R-G, B-G), 0)$
$B' = \max(\max(R-B, G-B), 0)$, wherein (R,G,B) corresponds to the original color values of red, green and blue, respectively, in the transfer function and (R',G',B') corresponds to the modified color values of red, green and blue, respectively.

7. The apparatus of claim 6, further comprising:
a display to display the image obtained by the inverting in a display area.

8. The apparatus of claim 6, wherein the 3D image data is tomographic imaging image data.

* * * * *